(12) United States Patent
Chen

(10) Patent No.: US 8,276,823 B2
(45) Date of Patent: Oct. 2, 2012

(54) FLEXIBLE CARD WITH DISPLAY FUNCTION

(75) Inventor: Chao-Chin Chen, Hsinchu (TW)

(73) Assignee: Anica Corporation, Taipei County (TW)

( * ) Notice: Subject to any disclaimer, the term of this patent is extended or adjusted under 35 U.S.C. 154(b) by 262 days.

(21) Appl. No.: 12/795,162

(22) Filed: Jun. 7, 2010

(65) Prior Publication Data

US 2011/0147461 A1 Jun. 23, 2011

(30) Foreign Application Priority Data

Dec. 22, 2009 (TW) ................................ 98144324 A

(51) Int. Cl.
*G06K 19/02* (2006.01)

(52) U.S. Cl. ........................................................ 235/488

(58) Field of Classification Search .................. 235/375, 235/382, 381, 380, 492, 493, 486, 488
See application file for complete search history.

(56) References Cited

U.S. PATENT DOCUMENTS

| | | | |
|---|---|---|---|
| 6,561,430 B2 | 5/2003 | Ou | |
| 7,156,313 B2 | 1/2007 | Ou et al. | |
| 7,191,952 B2 * | 3/2007 | Blossom | 235/492 |
| 7,599,192 B2 | 10/2009 | Pennaz et al. | |
| 2005/0050367 A1 | 3/2005 | Burger et al. | |
| 2006/0227669 A1 | 10/2006 | Pennaz et al. | |
| 2008/0110977 A1 | 5/2008 | Bonalle et al. | |
| 2008/0238658 A1 | 10/2008 | Yamada | |
| 2008/0308641 A1* | 12/2008 | Finn | 235/492 |
| 2009/0201304 A1 | 8/2009 | Suzuki et al. | |
| 2009/0240625 A1 | 9/2009 | Faith et al. | |

FOREIGN PATENT DOCUMENTS

| | | |
|---|---|---|
| CN | 101477607 A | 7/2009 |
| EP | 1564677 A1 | 8/2005 |
| JP | 11091275 A | 4/1999 |
| JP | 2002-501263 T | 1/2002 |
| JP | 2002-245422 A | 8/2002 |
| JP | 2004021288 A | 1/2004 |
| JP | 2005011189 A | 1/2005 |
| JP | 2008-276435 A | 11/2008 |
| JP | 2008-539473 T | 11/2008 |
| JP | 2009-230313 A | 10/2009 |
| TW | 420788 B | 2/2001 |
| TW | 566629 Y | 12/2003 |
| TW | 255425 B | 5/2006 |
| WO | WO-2008035883 A1 | 3/2008 |

OTHER PUBLICATIONS

European Patent Office Action dated Feb. 9, 2012.

* cited by examiner

*Primary Examiner* — Thien M Le
(74) *Attorney, Agent, or Firm* — Rabin & Berdo, P.C.

(57) ABSTRACT

A flexible card with display function includes a first card body, a second card body and a flexible thin electronic system disposed between the first card body and the second card body. The flexible thin electronic system includes a flexible display, a display circuit, a communication interface and a smart card IC. The display circuit is connected to the flexible display, and the communication interface is connected to the display circuit via the smart card IC. The smart card IC performs a security authentication, and communicates with the smart card IC and the display circuit after the security authentication succeeds.

29 Claims, 3 Drawing Sheets

FLEXIBLE CARD WITH DISPLAY FUNCTION

This application claims the benefit of Taiwan application Serial No. 98144324, filed Dec. 22, 2009, the subject matter of which is incorporated herein by reference.

BACKGROUND OF THE INVENTION

1. Field of the Invention

The invention relates in general to a card, and more particularly to a flexible card with display function.

2. Description of the Related Art

With the progress of the technology, many transaction and payment ways have been gradually replaced by the conventional integrated circuit (IC) card, such as a credit card, a debit card, a telephone card, a bus card, a metro stored-value card, or the like. The currently available IC cards may be classified into cards with a contact-type interface, a contactless-type interface and hybrid interfaces according to the communication interface.

The cards with the contact-type interfaces may be classified into a smart card and a memory card. The smart card has a control mechanism function and includes an 8-bit, 16-bit or 32-bit microprocessor with the encryption processing of DES, RSA or the like. The memory card includes a memory, such as a read only memory (ROM) or a non-volatile memory, having the memory capacity of 4K, 8K, 16K, . . . , or 1 M bytes.

The cards with the contactless-type interfaces may be classified into A, B and Felica types, wherein A and B types pertain to the proximity ISO 14443 standard, while the Felica type pertains to the standard of Sony Company, and the communication distances thereof range from 0 to 10 cm. The hybrid cards have the contact-type and contactless-type interfaces combined together, and are usually classified into a single chip card and a multi-chip card.

FIG. 1 (Prior Art) is a schematic illustration showing a conventional IC card 1 with display function. As shown in FIG. 1, the communication interface can be either a contactless type RF (radio frequency) interface or a contact-type communication interface, and the driving power source required therein can be a contactless type communication interface or a contact-type communication interface depending on the option of pattern. One can obtain the power source by making use of the following methods:

1. Contactless Type Communication Interface:

Non-contact type communication interface has an antenna 22 provided inside the IC of the contactless type RF interface to perform RF decryption through a communication interface 23 for the RF signals and coupling signals received from an external card reader. On the other hand, the coupling signal generates direct current to supply the internally required voltage through a rectifier/voltage regulator 27.

2. Contact-Type Communication Interface:

The contact-type communication interface has the IC 32 of a contact-type IC card perform decryption to be read in by the microprocessor 24 after the communication interface 23 has received the digital series signals of the external card reader. In the mean time, the external card reader also supplies direct current for internal usage through the contact-type interface.

The working flow chart of the IC card with display panel but without batteries of the invention is as follows:

The microprocessor 24, after receiving the signals from the communication interface 23, can store data in an EEPROM 28. The microprocessor 24 can also convert the data into the driving signals of the display panel 21 through the display driver 25 for the users to look up. The microprocessor 24 can also transmit the response signals to the antenna for the external card reader through the communication interface 23.

The charge-pump 26 converts the current source generated by the rectifier/voltage regulator 27 into a relatively higher voltage for the display driver 25 to convert into driving signals of the display panel 21.

In this way, the communication interface 23, after receiving the external data, can firstly decrypt and decode the data and display them on the display panel 21 for users to look up the data and their content. Since the display panel 21 employed by the invention is the one with bistable function having the characteristic that once the data are displayed, no persistent power supply for the display panel 21 is needed, thereby, the displayed data will be preserved persistently. In other word, not until the next time when the display panel 21 is driven again, and the displayed content or the updated data are changed, the data displayed on it will not disappear.

Moreover, the IC of the above-mentioned contactless type RF IC card (RFIC) 31 and the Contact Smart IC 32 are the Smart ICs that circulate in the market. The invention can easily make the market-circulated Smart IC (contact-type, contactless type, or dual interface type IC) upgrade their level to become display-type IC cards without batteries by adding elements such that their commands and ways of adding confidential means are compatible to those market-circulated Smart IC.

However, the conventional IC card 1 tends to be intruded by a hacker. The hacker can access the important data of the non-volatile readable memory 28 via the communication interface 23 and the microprocessor 24 so that the security of the conventional IC card is seriously affected. In addition, the conventional IC card 1 cannot withstand the curving, and the convenience in use is significantly deteriorated.

SUMMARY OF THE INVENTION

The invention is directed to a flexible card with display function. The flexible card may be curved so that the user can put the flexible card into his/her pocket or wallet. In addition, the flexible card with display function can prevent the hacker from intruding therein so that the security in use may be enhanced.

According to the present invention, a flexible card with display function is provided. The flexible card includes a first card body, a second card body and a flexible thin electronic system disposed between the first card body and the second card body. The flexible thin electronic system includes a flexible display, a display circuit, a communication interface and a smart card IC. The display circuit is connected to the flexible display. The communication interface is connected to the display circuit via the smart card IC. The smart card IC performs a security authentication. The communication interface communicates with the display circuit via the smart card IC after the security authentication succeeds.

The invention will become apparent from the following detailed description of the preferred but non-limiting embodiment. The following description is made with reference to the accompanying drawings.

DETAILED DESCRIPTION OF THE INVENTION

In order to enhance the convenience in use and prevent the card from being intruded by the hacker, a flexible card with display function will be provided in the following embodiment. The flexible card with display function includes a first card body, a second card body and a flexible thin electronic system disposed between the first card body and the second card body. The flexible thin electronic system includes a flexible display, a display circuit, a communication interface and a smart card IC. The display circuit is connected to the flexible display, and the communication interface is connected to the display circuit via the smart card IC. The smart card IC performs a security authentication. The communication interface can communicate with the display circuit via the smart card IC after the security authentication succeeds.

Figure 1:
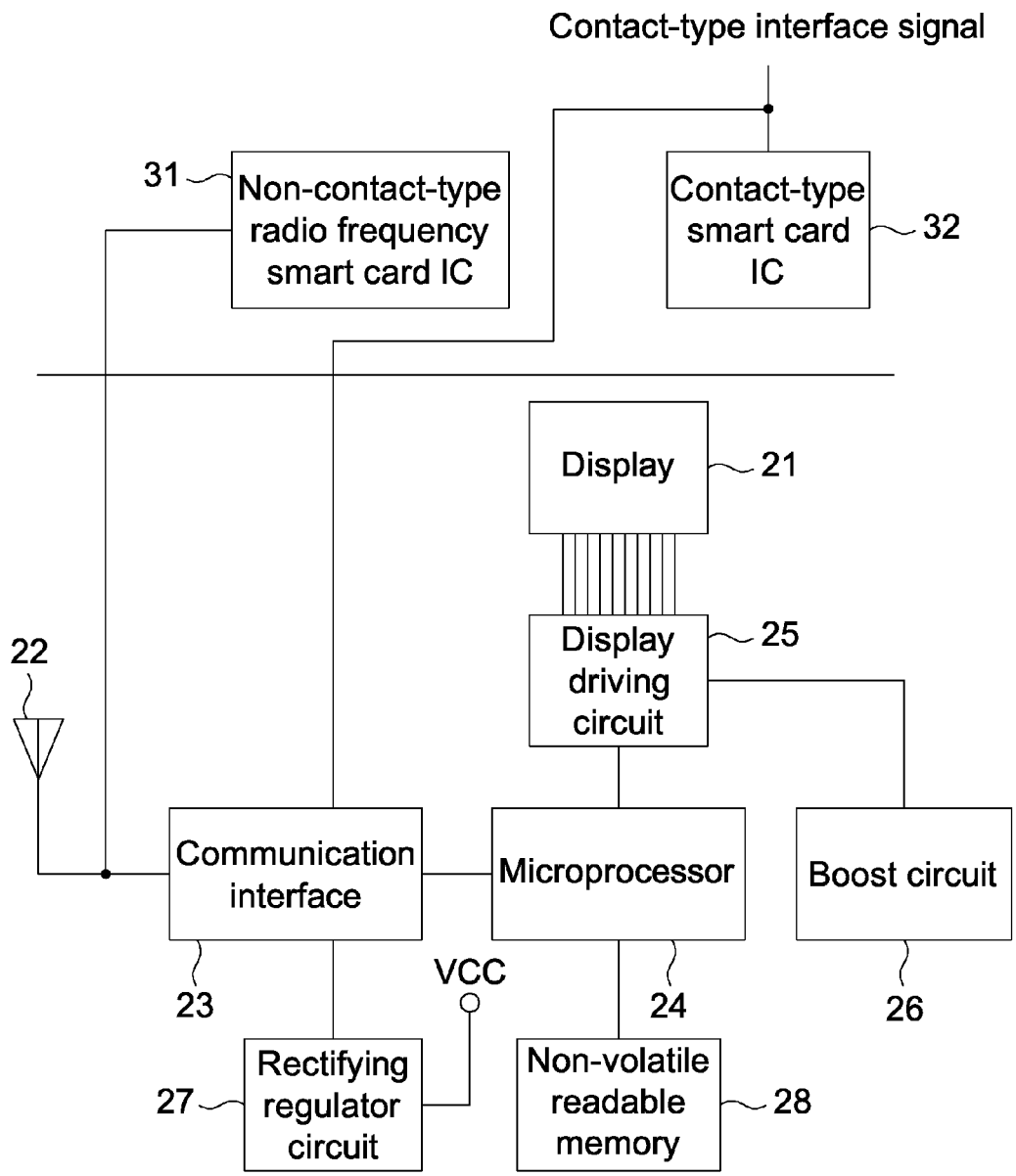
FIG. 1 (Prior Art) is a schematic illustration showing a conventional IC card.
Figure 2:
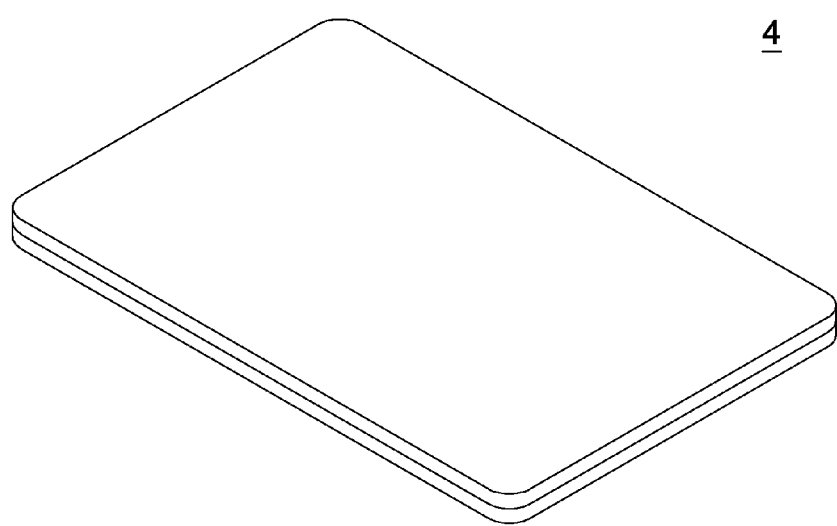
FIG. 2 shows the exterior of a flexible card with display function.
Figure 3:
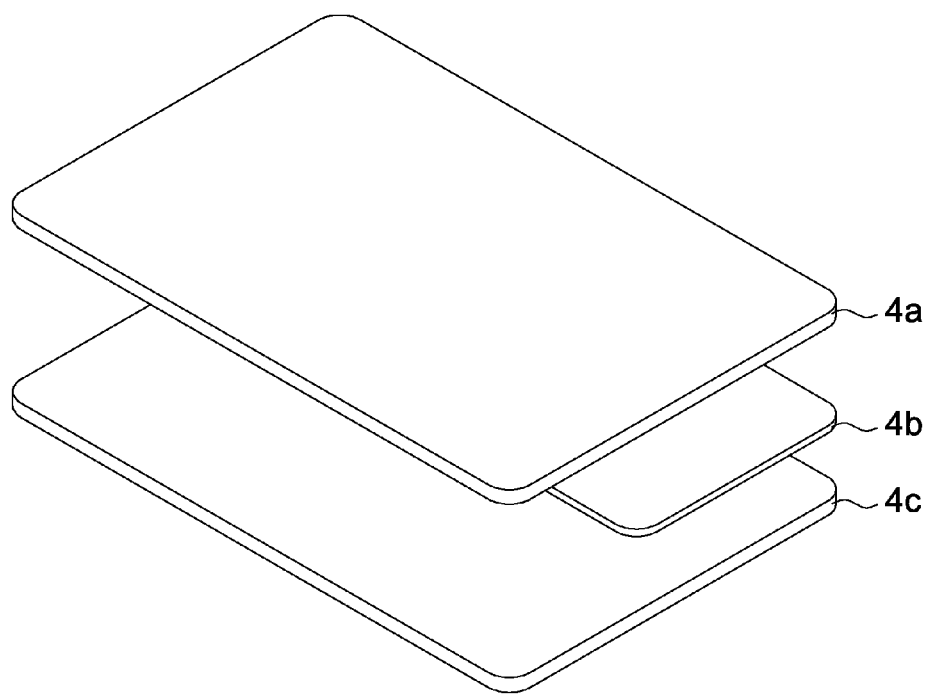
FIG. 3 is an exploded view showing the flexible card with display function.

FIG. 2 shows the exterior of a flexible card 4 with display function. FIG. 3 is an exploded view showing the flexible card 4 with display function. Referring to FIGS. 2 and 3, the flexible card 4 may be, for example, an integrated circuit (IC) card, and may be applied to, for example, a stored-value card, a password generator card, a traffic card, a membership card, a VIP card, an entrance card, an electronic key, a passport, an identity card, a label, a debit card, a credit card, an advertisement card, an entertainment card, a business card, a card-type computer, a card-type calculator, a card-type e-book, a card-type playstation or a physiological signal detection card. The stored-value card may be, for example, an electronic wallet, a point card, a traffic stored-value card, a telephone card or a cash card. The traffic card may be, for example, a traffic stored-value card, a traffic ticket information card or a ticket card. The label may be, for example, a price label or an anti-counterfeit mark.

The flexible card 4 includes a card body 4a, a flexible thin electronic system 4b and a card body 4c. The card body 4a and the card body 4c are adhered together by an adhesive material, for example. The gaps between the flexible thin electronic system 4b and the card body 4a and the card body 4c are filled with an adhesive material, for example. The adhesive material may be, for example, a thermally cured adhesive or may contain several adhesives mixed together. The card body 4a and the card body 4c may be formed with a window or a slot in advance, and the card body 4a and the card body 4c are a single-layer structure or a multi-layer structure. In addition, the card body 4a and the card body 4c may be combined together in advance and then injection molded, or the card body 4a and the card body 4c may be directly pressed together. The card body 4a and the card body 4c are respectively disposed on top and bottom sides, for example. The card body disposed on the side with the display function is a fully transparent card body or a partially transparent card body, so that the light rays of the flexible display of the flexible thin electronic system 4b can transmit through the card body.

For example, the flexible card 4 may further include a printed layer disposed on an outer side of the card body 4a or the card body 4c, or a printed layer disposed on an inner side of the card body 4a or the card body 4c. In addition, the outer side of the card body 4a or the card body 4c may further be coated with a protection layer having a hardness ranging from 2 H to 8 H. For example, the surfaces or inner layers of the card body 4a and the card body 4c may be formed with patterns by way of printing or thermal printing. The surfaces of the card body 4a and the card body 4c may be coated with protection layers to protect the card bodies themselves or the printed patterns. The card body 4a and the card body 4c are preferably pressed together by way of cold lamination. The cold lamination is performed using, for example, a thermally cured adhesive, an electromagnetic-wave cured adhesive or an adhesive containing two or more than two adhesives. Because the operation temperature is lower than 105° C., it is possible to prevent the elements of the flexible thin electronic system 4b from being overheated and damaged.

Figure 4:
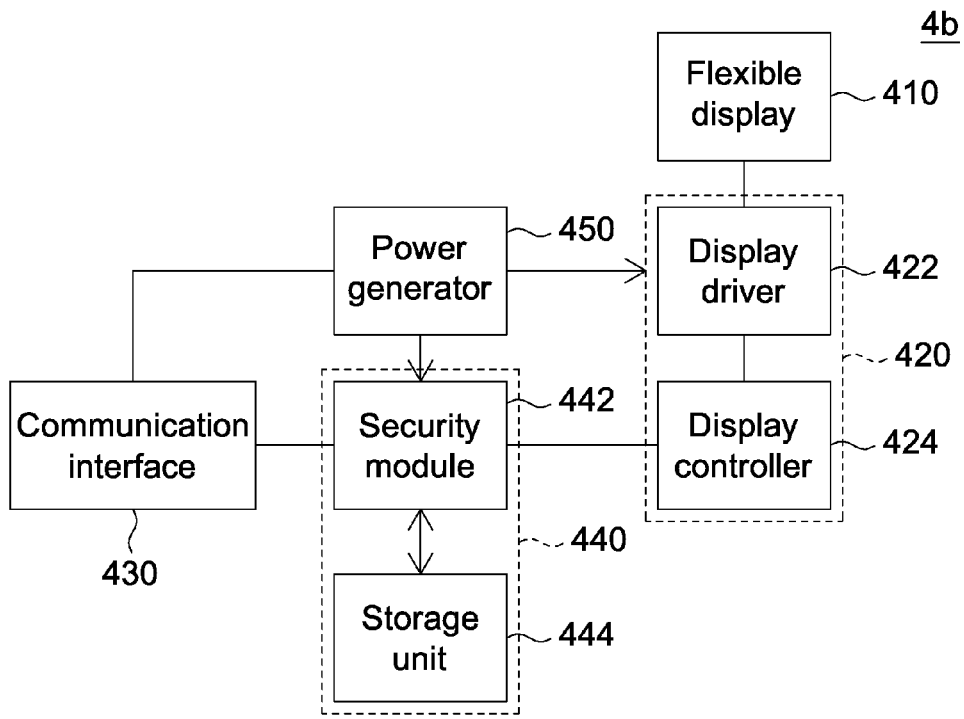
FIG. 4 is a schematic illustration showing a flexible thin electronic system.

FIG. 4 is a schematic illustration showing the flexible thin electronic system 4b. As shown in FIG. 4, the flexible thin electronic system 4b is disposed between the card body 4a and the card body 4c, and the flexible thin electronic system 4b includes a flexible display 410, a display circuit 420, a communication interface 430, a smart card IC 440 and a power generator 450. The flexible display 410 may be curved, when the card body 4a and the card body 4c are curved, without affecting its normal function. The display circuit 420 and the smart card IC 440 share the whole or a portion of an integrated circuit, or are disposed on a single integrated circuit.

For example, the flexible display 410 has the bistable property or multistable property such that the flexible display 410 may also permanently or temporarily keep the displayed contents without the power supply. For example, the flexible display 410 is an electrophoresis display, a cholesterol liquid crystal display, a liquid crystal display, a bistable display or a multistable display. In addition, the flexible display 410 may further be a flexible organic light-emitting diode (OLED) display, a flexible light-emitting diode (LED) display or a flexible liquid crystal display. Furthermore, the flexible display 410 may pertain to a segment type, a dot matrix type or a pattern type, for example.

The backplane of the flexible display 410 is a flexible printed circuit (FPC), for example. The material of the FPC may be, for example, FR4, FR5, PI, PET, PVC or PEN. In addition, the backplane of the flexible display 410 may further be an organic thin film transistor (OTFT), for example. In addition, the backplane of the flexible display 410 may also be manufactured by way of printing, silver glue printing, carbon ink printing or circuit etching.

The display circuit 420 is connected to the flexible display 410 and includes a display driver 422 and a display controller 424. The display driver 422 connected to the flexible display 410 drives the flexible display 410. The display controller 424 connected to the display driver 422 and the smart card IC 440 controls the display driver 422.

The communication interface 430 is an antenna, for example, and is connected to the display circuit 420 via the smart card IC 440. The smart card IC 440 may pertain to, for example, a contact type, a contactless type, or a hybrid type containing the contact type and the contactless type. In addition, the smart card IC 440 satisfies, for example, the ISO7816 standard, ISO/IEC14443 standard, ISO15693 standard, ISO/IEC18000 standard, ISO18185 standard, EMV standard, EMV Contactless standard, MIFARE standard or FELICA standard.

The smart card IC 440 performs the security authentication. The communication interface 430 communicates with the display circuit 420 via the smart card IC 440 after the security authentication succeeds. The smart card IC 440 further includes a security module 442 and a storage unit 444. The security module 442 performs the security authentication to prevent the card from being intruded by the hacker, and the data of the storage unit 444 cannot be accessed until the security authentication succeeds.

The power generator 450 is connected to the display circuit 420, the communication interface 430 and the smart card IC 440. The power generator 450 receives a radio frequency signal via the communication interface 430, and supplies the operation voltage for the flexible thin electronic system 4b according to the radio frequency signal. The power generator 450 may further include a DC/DC converter for converting a DC voltage into an operation voltage of the display circuit 420. In addition, the power of the power generator 450 may also be provided by an external device in a contact manner or a contactless manner, or may also be provided by a primary battery, a secondary battery or a solar cell. The secondary battery is, for example, a capacitor, a super capacitor, a rapidly charged capacitor, a lithium battery, or any other rechargeable battery, wherein the secondary battery may be charged in a contact manner or a contactless manner.

Figure 5:
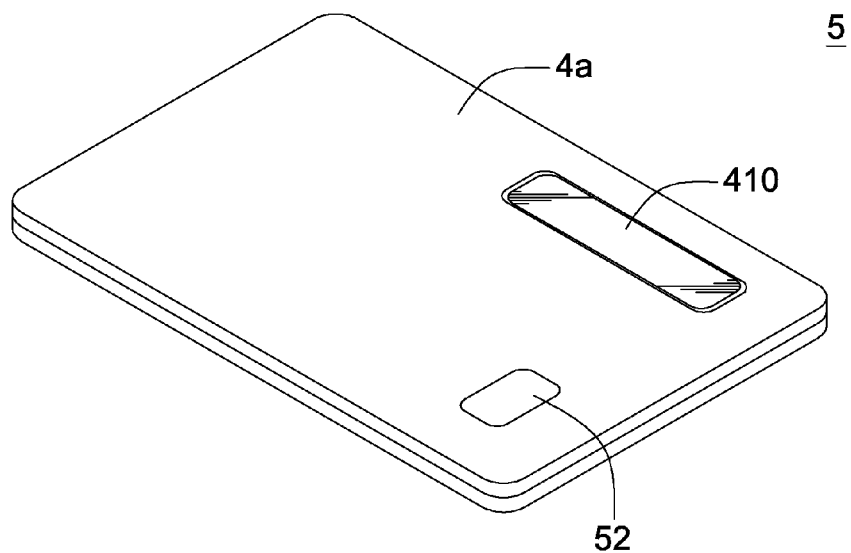
FIG. 5 shows the exterior of the flexible card with display function and a button unit.

FIG. 5 shows the exterior of a flexible card 5 with display function and a button unit. The difference between the flexible card 5 and the flexible card 4 is that the flexible card 5 further includes a button unit 52 disposed on a surface of the card body 4a. The button unit 52 includes, for example, one or more than one metal button or thick film button. In addition, the button unit 52 may further be a capacitive touch panel or a resistive touch panel, or may be disposed in the flexible thin electronic system.

The flexible card with display function according to the embodiment of the invention may withstand the flexible condition so that the user can easily put it into the pocket or wallet. In addition, the flexible card with display function according to the embodiment of the invention may further prevent the hacker from stealing data from the outside.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A flexible card with display function, the flexible card comprising:
    a first card body;
    a second card body; and
    a flexible thin electronic system disposed between the first card body and the second card body, the flexible thin electronic system comprising:
        a flexible display;
        a display circuit connected to the flexible display;
        a communication interface;
        a smart card IC, wherein the communication interface is connected to the display circuit via the smart card IC, the smart card IC performs a security authentication, and the communication interface communicates with the display circuit via the smart card IC after the security authentication succeeds; and
        a power generator connected to the display circuit, the communication interface and the smart card IC, wherein the power generator receives a radio frequency signal via the communication interface, and supplies an operation voltage for the flexible thin electronic system according to the radio frequency signal.

2. The flexible card according to claim 1, wherein a power of the power generator is provided by a primary battery, a secondary battery, a solar cell or an external device.

3. The flexible card according to claim 2, wherein the secondary battery is a capacitor, a super capacitor or a rapidly charged capacitor.

4. The flexible card according to claim 2, wherein the secondary battery is charged in a contact manner or a contactless manner.

5. The flexible card according to claim 1, wherein the power generator comprises: a DC/DC converter for converting a DC voltage into an operation voltage for the display circuit.

6. The flexible card according to claim 1, further comprising: a button unit disposed on a surface of the first card body.

7. The flexible card according to claim 6, wherein the button unit comprises at least one metal button.

8. The flexible card according to claim 6, wherein the button unit comprises at least one thick film button.

9. The flexible card according to claim 6, wherein the button unit is a touch panel.

10. The flexible card according to claim 1, further comprising: a button unit disposed in the flexible thin electronic system.

11. The flexible card according to claim 10, wherein the button unit comprises at least one metal button.

12. The flexible card according to claim 10, wherein the button unit comprises at least one thick film button.

13. The flexible card according to claim 1, wherein the smart card IC comprises: a security module for performing the security authentication; and a storage unit for accessing data of the storage unit after the security authentication succeeds.

14. The flexible card according to claim 1, wherein the display circuit comprises: a display driver, connected to the flexible display, for driving the flexible display; and a display controller, connected to the display driver and the smart card IC, for controlling the display driver.

15. The flexible card according to claim 1, wherein the display circuit and the smart card IC share the whole or a portion of an integrated circuit, or are disposed on a single integrated circuit.

16. The flexible card according to claim 1, wherein the first card body and the second card body are pressed by way of cold lamination.

17. The flexible card according to claim 16, wherein an operation temperature of the cold lamination is lower than 105.degree. C.

18. The flexible card according to claim 16, wherein the cold lamination is performed using a thermally cured adhesive or an electromagnetic-wave cured adhesive.

19. The flexible card according to claim 16, wherein the cold lamination is performed using two adhesives mixed together.

20. The flexible card according to claim 1, wherein the flexible display has a bistable or multistable property.

21. The flexible card according to claim 1, wherein the flexible display is an electrophoresis display, a cholesterol liquid crystal display, a liquid crystal display, a bistable liquid crystal display or a multistable liquid crystal display.

22. The flexible card according to claim 1, wherein the flexible display is a flexible organic light-emitting diode (OLED) display, a flexible light-emitting diode (LED) display or a flexible liquid crystal display.

23. The flexible card according to claim 1, wherein the flexible display pertains to a segment type, a dot matrix type or a pattern type.

24. The flexible card according to claim 1, wherein the smart card IC pertains to a contact type, a contactless type or a hybrid type containing the contact and contactless types.

25. The flexible card according to claim 1, wherein the smart card IC satisfies an EMV standard, a MIFARE standard or a FELICA standard.

26. The flexible card according to claim 1, wherein the first card body and the second card body are a single-layer structure or a multi-layer structure.

27. The flexible card according to claim 26, further comprising a printed layer disposed on an outer side of the first card body or the second card body.

28. The flexible card according to claim 26, further comprising a printed layer disposed on an inner side of the first card body or the second card body.

29. The flexible card according to claim 26, wherein an outer side of the first card body or the second card body is coated with a protection layer having a hardness ranging from 2 H to 8 H.

* * * * *